United States Patent
Kamada

(10) Patent No.: US 10,076,933 B2
(45) Date of Patent: Sep. 18, 2018

(54) RUBBER COMPOSITION AND PNEUMATIC TIRE

(71) Applicant: TOYO TIRE & RUBBER CO., LTD., Osaka-shi, Osaka (JP)

(72) Inventor: Shinsaku Kamada, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 147 days.

(21) Appl. No.: 15/211,460

(22) Filed: Jul. 15, 2016

(65) Prior Publication Data

US 2017/0022352 A1 Jan. 26, 2017

(30) Foreign Application Priority Data

Jul. 23, 2015 (JP) ................. 2015-146099

(51) Int. Cl.
*B60C 1/00* (2006.01)

(52) U.S. Cl.
CPC .......... *B60C 1/0025* (2013.01); *B60C 1/0016* (2013.01); *B60C 2001/005* (2013.01)

(58) Field of Classification Search
None
See application file for complete search history.

(56) References Cited

FOREIGN PATENT DOCUMENTS

| JP | 2005-206673 A | 8/2005 |
|---|---|---|
| JP | 2008-95028 A | 4/2008 |
| JP | 2010-53282 A | 3/2010 |
| JP | 2010053282 A * | 3/2010 |
| JP | 2014-210830 A | 11/2014 |
| JP | 2014210830 A * | 11/2014 |

OTHER PUBLICATIONS

Office Action dated Sep. 15, 2017, issued in counterpart Chinese Application No. 201610586199.X, with English machine translation. (9 pages).

* cited by examiner

*Primary Examiner* — Arrie L Reuther

(74) *Attorney, Agent, or Firm* — Westerman, Hattori, Daniels & Adrian, LLP

(57) ABSTRACT

A rubber composition comprises a diene rubber, a hydrocarbon type wax, cashew oil and a processing aid. The rubber composition can suppress whitening of a rubber surface and additionally can give black and luster to the rubber surface. The processing aid comprises at least one selected from the group consisting of a fatty acid metal salt, a fatty acid amide, a fatty acid ester and a fatty acid ester amide, wherein the proportion of constituent fatty acids having from 18 to 20 carbon atoms is from 20 to 60 mass %. A pneumatic tire has a rubber part (for example, a tread rubber, a side wall rubber or a rim strip) comprising the rubber composition.

8 Claims, 1 Drawing Sheet

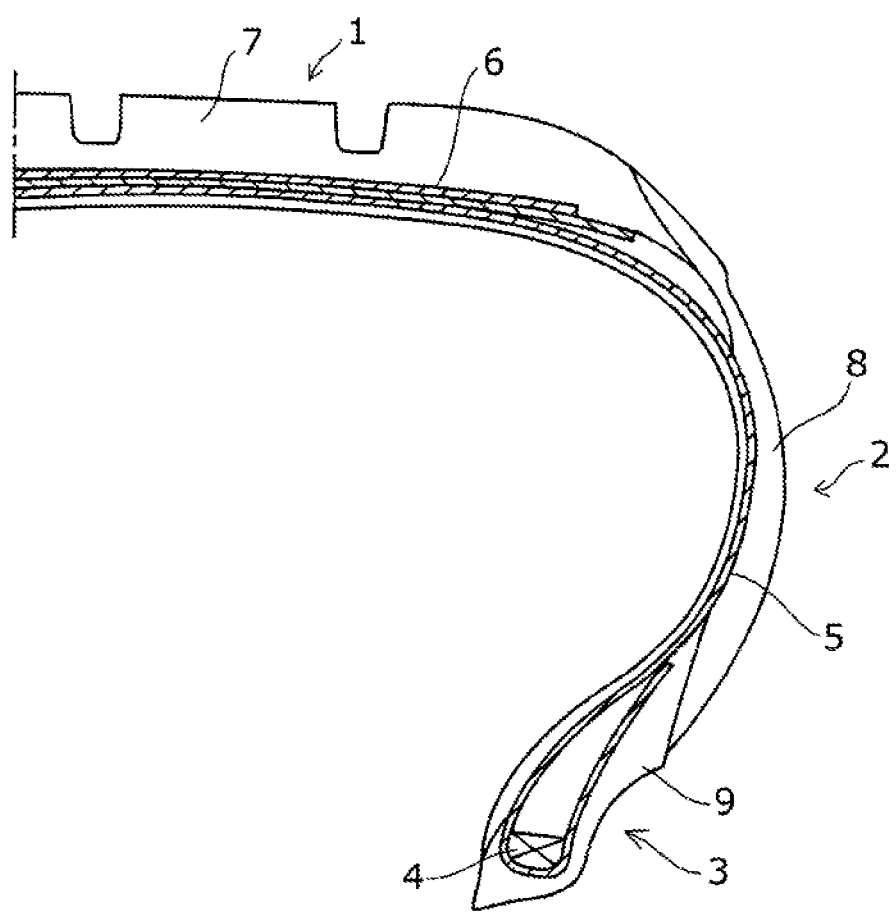

RUBBER COMPOSITION AND PNEUMATIC TIRE

CROSS-REFERENCE TO RELATED APPLICATIONS

This application is based upon and claims the benefit of priority from the prior Japanese Patent Application No. 2015-146099, filed on Jul. 23, 2015; the entire contents of which are incorporated herein by reference.

BACKGROUND

1. Technical Field

The present invention relates to a rubber composition and a pneumatic tire using the rubber composition

2. Related Art

A rubber composition forming a tread part, side wall part and rim strip of a pneumatic tire contains a wax in order to suppress deterioration by ozone in the air and ultraviolet rays. Wax has a deterioration suppressing effect, and on the other hand, whitens a rubber surface, becoming a factor of poor appearance of a tire.

To suppress whitening of a side wall part by a wax, JP-A-2014-210830 proposes to add a fatty acid metal salt having the carbon number of from 16 to 20 smaller than the carbon number of a hydrocarbon most contained in a wax, together with a wax. JP-A-2008-095028 proposes to add an aromatic oil having an average molecular weight of from 320 to 420 together with a hydrocarbon wax having a specific carbon number distribution in order to improve ozone resistance and appearance in good balance. However, it has been not known that black and luster can be given while preventing whitening, by adding a processing aid having a specific carbon number distribution together with cashew oil.

JP-A-2010-053282 discloses to add cashew oil to a rubber composition for a tire in order to improve rolling resistance performance, abrasion resistance, crack resistance and the like. However, this patent document does not disclose to use the cashew oil together with a processing aid having a specific carbon number distribution.

JP-A-2005-206673 discloses to add a fatty acid metal salt, a fatty acid amide and/or fatty acid ester as processing aids together with a silane coupling agent to a rubber composition for a tire tread in order to balance processability and tire performance in high dimension in the case of adding an inorganic filler having a hydroxyl group, such as silica. However, this patent document does not disclose to further use cashew oil together, and does not suggest in any fashion that the processing aid having a specific carbon number distribution exhibits excellent effect by using together with cashew oil.

SUMMARY

In view of the above, an object of the present embodiment is to provide a rubber composition that can suppress whitening of a rubber surface and additionally can give black and luster.

A rubber composition according to the present embodiment includes a diene rubber, a hydrocarbon type wax, cashew oil and a processing aid including at least one selected from the group consisting of a fatty acid metal salt, a fatty acid amide, a fatty acid ester and a fatty acid ester amide, and having a proportion of the constituent fatty acid having from 18 to 20 carbon atoms of from 20 to 60 mass %. A pneumatic tire according to the present embodiment includes a rubber part containing the rubber composition.

Addition of cashew oil together with a processing aid having such a specific carbon number distribution can suppress whitening of a rubber surface, and additionally can give black and luster to a rubber surface.

BRIEF DESCRIPTION OF THE DRAWING

FIG. 1 is a half cross-sectional view showing one example of a pneumatic tire.

DETAILED DESCRIPTION

Elements for carrying out the present embodiment are described in detail below.

The rubber composition according to the present embodiment comprises (A) a diene rubber, (B) a hydrocarbon type wax, (B) cashew oil, and (D) a processing aid.

(A) Diene Rubber

Diene rubber as a rubber component is not particularly limited. Examples of the diene rubber that can be used include natural rubber (NR), polyisoprene rubber (IR), polybutadiene rubber (BR), styrene-butadiene rubber (SBR), styrene-isoprene rubber, butadiene-isoprene rubber, styrene-butadiene-isoprene rubber and nitrile rubber (NBR). Those diene rubbers can be used alone or as mixtures of two or more thereof. More preferred diene rubber is at least one selected from the group consisting of natural rubber, polyisoprene rubber, styrene-butadiene rubber and polybutadiene rubber.

(B) Hydrocarbon Type Wax

Examples of the hydrocarbon type wax include various hydrocarbons such as saturated hydrocarbon, unsaturated hydrocarbon, alicyclic hydrocarbon or aromatic hydrocarbon, and waxes comprising a mixture of two or more kinds thereof. Specific examples of the hydrocarbon type wax include petroleum wax, paraffin type synthetic wax and polyolefin type wax (polyethylene wax and the like). Those waxes may be used as mixtures thereof. Petroleum wax is preferred, and examples thereof include paraffin wax and/or microcrystalline wax. Petroleum wax containing paraffin wax, that is, paraffin type petroleum wax, is preferred, and paraffin wax or a mixture of paraffin wax and microcrystalline is more preferred. The hydrocarbon wax generally contains hydrocarbons having from 20 to 50 carbon atoms.

The amount of the hydrocarbon type wax added is not particularly limited. For example, the amount of the hydrocarbon type wax added may be from 0.1 to 10 parts by mass, may be from 0.5 to 5 parts by mass, and may be from 1 to 3 parts by mass, per 100 parts by mass of the diene rubber, from the standpoint of ozone resistance and the like.

(C) Cashew Oil

Cashew oil is an oily liquid extracted from a shell of cashew nut, and can give black and luster to a rubber surface. The cashew oil may be natural cashew nut shell liquid (CNSL) comprising anacardic acid as a main component and may be decarboxylated CNSL obtained by subjecting CNSL after oil extraction to a heat treatment to decarboxylate anacardic acid. The decarboxylated CNSL contains cardanol, cardol and 2-methylcardol as a monomer component, and the cardanol is a main component. The decarboxylated CNSL may further contain an ash and a polymer together with those monomers. Cashew monomer in which an ash and a polymer have been removed from decarboxylated CNSL by distillation purification may be used. Cashew polymer in which decarboxylated CNSL has been used as a raw material and a part of the monomer has been polymerized (preferably without using a bonding agent) may be used. Preferred cashew oil is at least one selected from the group consisting of decarboxylated CNSL, a cashew monomer and a cashew polymer.

The cashew oil contains at least one monomer selected from the group consisting of cardanol, cardol, 2-methylcardol, and anacardic acid. Those components are represented by the following formulae (1) to (4). The proportion of monomers in the cashew oil (that is, the content of monomers contained in the cashew oil) is not particularly limited. The proportion of monomers may be 30 mass % or more, may be 40 mass % or more, and may be 60 mass % or more.

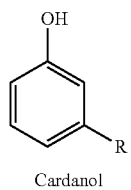

Cardanol (1)

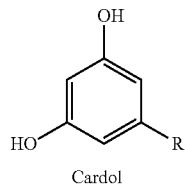

Cardol (2)

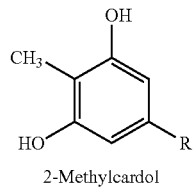

2-Methylcardol (3)

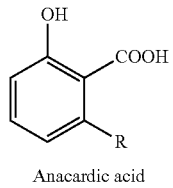

Anacardic acid (4)

In the above formulae, R is a linear hydrocarbon group and has any structure represented by;
—$(CH_2)_{14}CH_3$,
—$(CH_2)_7CH=CH(CH_2)_5CH_3$,
—$(CH_2)_7CH=CHCH_2CH=CH(CH_2)_2CH_3$ or
—$(CH_2)_7CH=CHCH_2CH=CHCH_2CH=CH_2$. Each compound represented by the formulae (1) to (4) comprises a compound in which R is one kind or different two or more kinds.

The cashew oil is preferably that the proportion of cardol in monomers is from 10 to 30 mass %. The cardol is a component that gives black to a rubber surface. When the cardol proportion is 10 mass % or more, black effect can be enhanced. On the other hand, when the cardol proportion is 30 mass % or less, the phenomenon that a color other than black becomes strong and black effect is rather decreased can be suppressed. Furthermore, when the cardol proportion is 30 mass % or less, the cardanol proportion is increased and luster effect can be enhanced. The cardol proportion is preferably from 15 to 30 mass %, and more preferably from 15 to 25 mass %/o.

The cashew oil is preferably that the proportion of cardanol in monomers is from 70 to 90 mass %. The cardanol is a component similar to urushiol contained in Japanese lacquer, and is a component that gives luster to a rubber component. When the cardanol proportion is 70 mass % or more, luster effect can be enhanced. On the other hand, when the cardanol proportion is 90 mass % or less, the phenomenon that rubber surface state changes and luster effect is rather decreased can be suppressed. Furthermore, when the cardanol proportion is 90 mass % or less, the cardol proportion is increased, and black effect can be enhanced. The cardanol proportion is preferably from 70 to 85 mass %, and more preferably from 75 to 85 mass %.

The monomer proportion, cardol proportion and cardanol proportion can be measured using gas chromatography (GC). In detail, those are obtained by using a phenyl column (VF-5 ms; manufactured by Agilent Technologies) and measuring under the conditions of carrier gas: helium, flow rate: 4 mL/min and temperature rising rate: 6° C./min in a temperature range of from 40° C. to 300° C.

The amount of the cashew oil added is not particularly limited. From the standpoint of enhancing the effect of giving black and luster, the amount of the cashew oil is preferably from 1 to 40 parts by mass, more preferably from 3 to 30 parts by mass, and still more preferably from 5 to 25 parts by mass, per 100 parts by mass of the diene rubber.

(D) Processing Aid

The processing aid that can be used in the present embodiment is at least one selected from the group consisting of a fatty acid metal salt, a fatty acid amide, a fatty acid ester and a fatty acid ester amide. When those processing aids are used, a rubber surface is smoothened and whitening by a wax can be suppressed. Thus, the effect of the cashew oil can be further remarkably exhibited. In detail, when a rubber surface has been bloomed, flexibility is given to the processing aid, thereby crystals of the hydrocarbon type wax and the cashew oil can be smoothly covered with the processing aid, and the wax and cashew oil can be uniformed on a rubber surface. As a result, whitening of a rubber surface due to a wax can be suppressed, and furthermore it is considered that black and luster can be given to a rubber surface by effectively exhibiting the effect of cashew oil.

The processing aid used in the present embodiment is a processing aid in which the proportion of the constituent fatty acid having from 18 to 20 carbon atoms (hereinafter referred to as "C18-20 proportion") is from 20 to 60 mass %. The constituent fatty acid used herein is fatty acid constituting the above-described fatty acid metal salt, fatty acid amide, fatty acid ester and fatty acid ester amide. Therefore, the carbon number of the constituent fatty acid does not include the carbon number of an alcohol constituting the fatty acid ester, and the carbon number of a hydrocarbon group and the like as a substituent in the case of a secondary amine or a tertiary amine in the fatty acid amide. Furthermore, when a plurality of fatty acid residues (that is, constituent fatty acid) is present in one molecule, the carbon number is the carbon number of the respective fatty acid residues. Therefore, the C18-20 proportion is the proportion (content) of the constituent fatty acid having from 18 to 20 carbon atoms occupied in the entire constituent fatty acids constituting the processing aid. When the C18-20 proportion is 20 mass % or more, the smoothening effect of a rubber surface is enhanced, and the suppressing effect of whitening can be exhibited. On the other hand, when the C18-20 proportion is 60 mass % or less, whitening of a rubber surface by a wax can be suppressed. The C18-20 proportion is preferably from 20 to 50 mass %, more preferably from 20 to 40 mass %, and still more preferably from 20 to 30 mass %.

The carbon number distribution of the processing aid can be obtained using reactive pyrolysis GCMS method. In the measurement of C18-20 proportion described in the following Examples, pyrolysis was conducted at 350° C. using a pyrolyzer (3030D) manufactured by Frontier Laboratories Ltd., and the measurement of pyrolysis GC/MS was conducted using GC/MS device (Automass SUN) manufactured by JOEL Ltd. (column used: UA-DX30 (manufactured by Frontier Laboratories Ltd.), carrier gas: helium, flow rate: 1 mL/min, temperature rising rate: 10° C./min). In this case, a material obtained by adding 2 μL of a 25 mass % tetramethylammonium hydroxide/methanol solution to about 200 μg of a sample was used as a measurement sample. C18-20 proportion that is the content of a constituent fatty acid having from 18 to 20 carbon atoms is calculated from carbon number distribution obtained.

The fatty acid constituting the fatty acid metal salt used as the processing aid is not particularly limited so long as it satisfies the C18-20 proportion described above. Examples of the fatty acid include saturated fatty acid and/or unsaturated fatty acid, having from 5 to 36 carbon atoms, and the saturated fatty acid and/or unsaturated fatty acid, having from 8 to 24 carbon atoms are preferably used. Specific examples of the fatty acid include octanic acid, capric acid, lauric acid, myristic acid, palmitic acid, stearic acid, arachidic acid, oleic acid, linoleic acid and linolenic acid. Examples of the metal salt include an alkali metal salt such as sodium salt or potassium salt, an alkaline earth metal salt such as magnesium salt or calcium salt, and a transition metal salt such as zinc salt, cobalt salt or copper salt. Of those, an alkali metal salt and/or an alkaline earth metal salt are preferred, and potassium salt and/or calcium salt are more preferred.

The fatty acid constituting the fatty acid amide is not particularly limited so long as it satisfies the C18-20 proportion described above. Similar to the fatty acid metal salt, examples of the fatty acid include saturated fatty acid and/or unsaturated fatty acid, having from 5 to 36 carbon atoms, and saturated fatty acid and/or unsaturated fatty acid, having from 8 to 24 carbon atoms are preferably used. The fatty acid amide is a fatty acid amide having a long-chain aliphatic group and an amide group in the molecule. The fatty acid amide may be a primary amide such as stearic acid amide, and may be a secondary amide or a tertiary amide, obtained by reacting a fatty acid compound with a primary amine or a secondary amine. Furthermore, the fatty acid amide may be methylol amide or ethanol amide, and may be alkylene bis-fatty acid amide having two fatty acid residues. Methylene or ethylene is preferred as the alkylene.

The fatty acid constituting the fatty acid ester is not particularly limited so long as it satisfies the C18-20 proportion described above. Similar to the fatty acid metal salt, examples of the fatty acid include saturated fatty acid and/or unsaturated fatty acid, having from 5 to 36 carbon atoms, and saturated fatty acid and/or unsaturated fatty acid, having from 8 to 24 carbon atoms are preferably used. The alcohol constituting the fatty acid ester is not particularly limited, and may be not only a monohydric alcohol such as methanol, ethanol, propanol or butanol, but also a dihydric or more alcohol such as glycol, glycerin, erythritol or sorbitol. Fatty acid ester having two or more fatty acid residues obtained using a dihydric or more alcohol may be used.

The fatty acid constituting the fatty acid ester amide is not particularly limited so long as it satisfies the C18-20 proportion described above. Similar to the fatty acid metal salt, examples of the fatty acid include saturated fatty acid and/or unsaturated fatty acid, having from 5 to 36 carbon atoms, and saturated fatty acid and/or unsaturated fatty acid, having from 8 to 24 carbon atoms are preferably used. The fatty acid ester amide (also called amide ester) is a long-chain fatty acid monoamide having a long-chain aliphatic acyl group as a substituent, and example thereof includes N-(acyloxyalkyl)alkanecarboxylic acid monoamide.

A mixture of (D1) a fatty acid metal salt and (D2) at least one selected from the group consisting of fatty acid amide, fatty acid ester and fatty acid ester amide is preferably used as the processing aid. The component (D1) is preferably a metal salt other than zinc salt, and more preferably an alkaline earth metal salt and/or an alkali metal salt such as calcium salt and/or potassium salt. The fatty acid amide is preferably used as the component (D2). The ratio between the component (D1) and the component (D2) is not particularly limited, but is preferably D1/D2=2/8 to 8/2 in mass ratio.

The amount of the processing aid added is not particularly limited, but is preferably from 1 to 10 parts by mass, and more preferably from 2 to 8 parts by mass, per 100 parts by mass of the diene rubber, from the standpoints that whitening by a wax is suppressed and the effect of cashew oil is enhanced.

(E) Other Components

The rubber composition according to the present embodiment can further contain various additives generally used in a rubber composition, such as a filler, an age resister, zinc flower, stearic acid, a process oil, a vulcanizing agent or a vulcanization accelerator, in addition to the above-described components.

Carbon black and/or silica can be added as the filler. The carbon black is not particularly limited, and can use furnace carbon blacks of various grades, such as SAF grade (N100 Series), ISAF grade (N200 Series), HAF grade (N300 Series) and FEF grade (N500 Series) (those are ASTM grade), that are used as a reinforcing agent for a rubber. The silica is not particularly limited, but wet silica (hydrated silicic acid) is preferred. The amount of the filler added is not particularly limited, but is preferably from 10 to 150 parts by mass, more preferably from 20 to 120 parts by mass, and still more preferably from 30 to 100 parts by mass, per 100 parts by mass of the diene rubber. As one embodiment, the amount of the carbon black added is from 10 to 120 parts by mass, and preferably from 20 to 100 parts by mass, per 100 parts by mass of the diene rubber. The amount of the silica added is from 10 to 120 parts by mass, and preferably from 20 to 100 parts by mass, per 100 parts by mass of the diene rubber.

When silica is added as the filler, a silane coupling agent such as sulfide silane or mercaptosilane may be added in order to further improve dispersibility of silica. The amount of the silane coupling agent added is not particularly limited, but is preferably from 2 to 20 mass % based on the amount of silica added.

Examples of the age resister include amine type age resisters such as N-phenyl-N'-(1,3-dimethylbutyl)-p-phenylenediamine (6PPD) or N-isopropyl-N'-phenyl-p-phenylenediamine (IPPD), and phenol type age resisters such as 2,6-di-tert-butyl-4-methylphenol (DTBMP). Of those age resisters, the amine type age registers are preferably used, an aromatic secondary amine is more preferably used, and p-phenylenediamine type age resister is particularly preferably used. The amount of the age resister added is not particularly limited, but is preferably from 1 to 10 parts by mass, and more preferably from 1 to 5 parts by mass, per 100 parts by mass of the diene rubber.

Examples of the vulcanizing agent include sulfurs such as powdered sulfur, precipitated sulfur, colloidal sulfur, insoluble sulfur and highly dispersible sulfur. The amount of the vulcanizing agent added is not particularly limited, but is preferably from 0.1 to 10 parts by mass, and more preferably from 0.5 to 5 parts by mass, per 100 parts by mass of the diene rubber.

The rubber composition according to the present embodiment can be prepared by kneading the necessary components according to the conventional method using a mixing machine generally used, such as Banbury mixer, a kneader or rolls. Specifically, other additives excluding a vulcanizing agent and a vulcanization accelerator are added to a diene rubber together with a hydrocarbon type wax, cashew oil and a processing aid, followed by mixing, in a first mixing step. A vulcanizing agent and a vulcanization accelerator were then added to the mixture thus obtained, followed by mixing, in a final mixing step. Thus, a rubber composition can be prepared.

The rubber composition thus obtained can be used in various rubber members for tires, vibrationproof rubbers, conveyer belts and the like. The rubber composition is preferably used in tires, and can be applied to various uses and sizes such as for passenger cars or for heavy load of trucks or buses, and each site of a tire, such as a tread rubber, a side wall rubber or a rim stripe of pneumatic tires.

FIG. 1 is a view showing one example of a pneumatic tire. The pneumatic tire comprises a tread part 1, a pair of right and left sidewall parts 2 extending inside in a radial direction from both edges of the tread part, and a pair of right and left bead parts 3 provided inside in a radial direction of the sidewall parts 2. A carcass ply 5 toroidally extending between a pair of bead cores 4 embedded in a pair of bead parts 3 is embedded in the pneumatic tire. A belt 6 is provided at the outer circumferential side in a radial direction of the carcass ply 5 in the tread part 1.

The pneumatic tire further comprises a tread rubber 7 provided at an outer circumferential side in a radial direction of the belt 6 in the tread part 1 and forming a ground contact surface, a side wall rubber 8 provided at a tire outer surface side of the carcass ply 5 in the side wall part 2 and forming a tire outer surface of the sidewall part 2, and a rim strip 9 provided so as to cover a region in contact with a rim flange in the bead part 3 and forming a tire outer surface of the bead part 3. The rim strip 9 is a rubber layer provided outside the bead part 3 in continuation with a lower edge of the sidewall rubber 8.

Those tread rubber 7, sidewall rubber 8 and rim strip 9 form an outer surface of a pneumatic tire, and are therefore required to suppress discoloration of a rubber surface. For this reason, the rubber composition according to the present embodiment is preferably used.

The pneumatic tire can be manufactured according to the conventional method using the rubber composition according to the present embodiment. For example, unvulcanized tread rubber member, side wall rubber member and/or rim strip rubber member are obtained by molding the rubber composition in a give shape by extrusion processing, and those are combined with other parts, thereby manufacturing a green tire. The green tire obtained is vulcanization-molded at a temperature of, for example, from 140 to 180° C., thereby a pneumatic tire can be manufactured. The pneumatic tire according to the present embodiment is that at least one of a tread rubber, a side wall rubber or a rim strip is formed by the rubber composition according to the present embodiment.

EXAMPLES

Examples of the present embodiment are described below, but the present invention is not construed as being limited to those examples.

Banbury mixer was used. Compounding ingredients other than sulfur and a vulcanization accelerator were added to and kneaded with a diene rubber according to the formulations (parts by mass) shown in Table 1 below in a first mixing step (discharge temperature: 160° C.). Sulfur and a vulcanization accelerator were added to and kneaded with the kneaded material obtained above in a final mixing step (discharge temperature: 90° C.). Thus, a rubber composition was prepared. The details of each component in Table 1 are as follows.

SBR 1: Styrene-butadiene rubber, "VSL5025" manufactured by LANXESS

SBR 2: Styrene-butadiene rubber, "SBR1502" manufactured by JSR Corporation

Carbon black: N339, "SFAST KH" manufactured by Tokai Carbon Co., Ltd.

Silica: "NIPSIL AQ" manufactured by Tosoh Silica Corporation

Silane coupling agent: "Si75" manufactured by Evonik Degussa

Paraffin oil: "PROCESS NC140" manufactured by JX Nippon Oil & Sun-Energy Corporation Stearic acid: "LUNAC S-20" manufactured by Kao Corporation Zinc flower: "Zinc Flower #1" manufactured by Mitsui Mining & Smelting Co., Ltd.

Age resister: "ANTIGEN 6C" manufactured by Sumitomo Chemical Co., Ltd.

Wax: Paraffin type petroleum wax, "OZOACE 0355" manufactured by Nippon Seiro Co., Ltd.

Vulcanization accelerator: "SOXINOL CZ" manufactured by Sumitomo Chemical Co., Ltd.

Sulfur: "Powdered Sulfur" manufactured by Tsurumi Chemical Industry Co., Ltd.

Processing aid 1: "AFLUX 16" manufactured by Rhein Chemie (a mixture of fatty acid calcium salt and fatty acid amide, C18-20 proportion: 24 mass %)

Processing aid 2: "ULTRA FLOW 160" manufactured by Performance Additive (a mixture of fatty acid calcium salt and fatty acid amide, C18-20 proportion: 35 mass %)

Processing aid 3: "STRUKTOL WB16" manufactured by Schill+Seilacher (a mixture of fatty acid calcium salt and fatty acid amide, C18-20 proportion: 62 mass %)

Processing aid 4: "ULTRA FLOW 500" manufactured by Performance Additive (fatty acid zinc salt, C18-20 proportion: 16 mass %)

Cashew oil 1: "CNSL" manufactured by Tohoku Chemical Industries, Ltd. (decarboxylated CNSL, monomer proportion: 80 mass %, cardanol proportion in monomer. 82 mass %, cardol proportion in monomer: 18 mass %)

Cashew oil 2: "LB7000" manufactured by Tohoku Chemical Industries, Ltd. (cashew monomer, monomer proportion: 100 mass %, cardanol proportion in monomer: 90 mass %, cardol proportion in monomer: 10 mass %)

Cashew oil 3: "LB7250" manufactured by Tohoku Chemical Industries, Ltd. (cashew monomer, monomer proportion: 100 mass %, cardanol proportion in monomer: 95 mass %, cardol proportion in monomer: 5 mass %)

Cashew oil 4: "CD-5L" manufactured by Tohoku Chemical Industries, Ltd. (cashew polymer, molecular weight of CNSL was increased without using a bonding agent, monomer proportion: 45 mass %, cardanol proportion in monomer: 70 mass %, cardol proportion in monomer: 30 mass %)

Each rubber composition was vulcanized at 160° C. for 20 minutes to prepare each test piece, and appearance (blackness), appearance (glossiness), appearance (whitening) and ozone resistance of each test piece were evaluated. Each evaluation method is as follows.

Appearance (blackness): A vulcanized rubber piece was placed in an oven adjusted to a temperature of 40° C., and was allowed to stand therein for 3 weeks. Thereafter, brightness of the surface of the vulcanized rubber piece was measured with a color reader ("CR-200" manufactured by Konica Minolta, Inc.) An inverse number of a ratio (%) of the brightness thus obtained when black is brightness 0% was indicated by an index as the value of Comparative Example 1 being 100. Blackness is high as the index is high.

Appearance (glossiness): A vulcanized rubber piece was placed in an oven adjusted to a temperature of 40° C., and was allowed to stand therein for 3 weeks. Thereafter, glossiness of the surface of the vulcanized rubber piece was measured with a gloss meter ("Uni-Gloss 60" manufactured by Konica Minolta, Inc.). A ratio (%) of the glossiness thus obtained when glossiness of a glass surface is 100% was indicated as the value of Comparative Example 1 being 100. Glossiness is high as the index is high.

Appearance (whitening): A vulcanized rubber piece was placed in an oven adjusted to a temperature of 40° C., and was allowed to stand therein for 3 weeks. Thereafter, the surface of the vulcanized rubber piece was visually observed, and appearance (whitening) was evaluated by the following criteria.

A: Surface is black, and discoloration is not substantially observed
B: Surface is slightly discolored white
C: Surface is somewhat discolored white
D: Surface is discolored white Ozone resistance: According to JIS K6259, a vulcanized rubber piece was allowed to stand under the condition of a temperature of 25° C. in 25% elongation and ozone concentration of 50 pphm for 24 hours. Thereafter, generation state of cracks was visually observed. A vulcanized rubber piece free of cracks was designated as "A", and a vulcanized rubber piece having cracks was designated as "B".

poor. In Comparative Example 3, cashew oil was added, but a processing aid was not added. As a result, the suppressing effect of whitening was not obtained. In Comparative Example 4, a processing aid was added together with cashew oil, but C18-20 proportion of the processing aid was small. As a result, the suppressing effect of whitening was not obtained. In Comparative Example 5, a processing aid was added together with cashew oil, but C18-20 proportion of the processing aid was large. As a result, the wax and processing aid were precipitated, and bad influence was observed in all appearances.

On the other hand, in Examples 1 to 10, by adding cashew oil and a processing aid having specific carbon number distribution, a synergistic effect of those was obtained. As a result, whitening of a rubber surface could be prevented while exhibiting ozone resistance by a wax, and black and luster could be given.

Example 2 is an example that a processing aid was changed in Example 1, and the suppressing effect of whitening was slightly poor as compared with Example 1. From this fact, it is considered that it is preferred that a processing aid to be used together with cashew oil has small C18-20 proportion as possible in a range of from 20 to 60 mass %, for example, from 20 to 30 mass %.

Examples 3 to 5 are examples that the kind of cashew oil was changed in Example 1. In Example 3, the cardol proportion of cashew oil is lower than that in Example 1, and as a result, blackness and glossiness were slightly poor as compared with those of Example 1. In Example 4, the cardol proportion of cashew oil is lower than that in Example 3, and the improvement effect of blackness and glossiness was poor

TABLE 1

| Formulation (Parts by mass) | Com. Ex. 1 | Com. Ex. 2 | Com. Ex. 3 | Com. Ex. 4 | Com. Ex. 5 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|---|---|---|
| SBR 1 | 60 | 60 | 60 | 60 | 60 | 60 | 60 | 60 | 60 | 60 | 60 | 60 | 60 | 60 | 60 |
| SBR 2 | 40 | 40 | 40 | 40 | 40 | 40 | 40 | 40 | 40 | 40 | 40 | 40 | 40 | 40 | 40 |
| Processing aid 1 | | 5 | | | | 5 | | 5 | 5 | 5 | 5 | 10 | 2 | 5 | 5 |
| Processing aid 2 | | | | | | | 5 | | | | | | | | |
| Processing aid 3 | | | 5 | | | | | | | | | | | | |
| Processing aid 4 | | | | 5 | | | | | | | | | | | |
| Cashew oil 1 | | | 20 | 20 | 20 | 20 | 20 | | | | 40 | 20 | 20 | 5 | 10 |
| Cashew oil 2 | | | | | | | | 20 | | | | | | | |
| Cashew oil 3 | | | | | | | | | 20 | | | | | | |
| Cashew oil 4 | | | | | | | | | | 20 | | | | | |
| Carbon black | 20 | 20 | 20 | 20 | 20 | 20 | 20 | 20 | 20 | 20 | 20 | 20 | 20 | 20 | 20 |
| Silica | 70 | 70 | 70 | 70 | 70 | 70 | 70 | 70 | 70 | 70 | 70 | 70 | 70 | 70 | 70 |
| Silane coupling agent | 7 | 7 | 7 | 7 | 7 | 7 | 7 | 7 | 7 | 7 | 7 | 7 | 7 | 7 | 7 |
| Paraffin oil | 40 | 40 | 20 | 20 | 20 | 20 | 20 | 20 | 20 | 20 | | 20 | 20 | 35 | 30 |
| Stearic acid | 2 | 2 | 2 | 2 | 2 | 2 | 2 | 2 | 2 | 2 | 2 | 2 | 2 | 2 | 2 |
| Zinc flower | 3 | 3 | 3 | 3 | 3 | 3 | 3 | 3 | 3 | 3 | 3 | 3 | 3 | 3 | 3 |
| Age register | 2 | 2 | 2 | 2 | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 | 2 | 2 | 2 | 2 |
| Vulcanization accelerator | 2 | 2 | 2 | 2 | 2 | 2 | 2 | 2 | 2 | 2 | 2 | 2 | 2 | 2 | 2 |
| Sulfur | 2 | 2 | 2 | 2 | 2 | 2 | 2 | 2 | 2 | 2 | 2 | 2 | 2 | 2 | 2 |
| Evaluation | | | | | | | | | | | | | | | |
| Appearance (blackness) | 100 | 95 | 103 | 105 | 84 | 113 | 112 | 107 | 102 | 124 | 107 | 101 | 110 | 103 | 106 |
| Appearance (Glossiness) | 100 | 97 | 103 | 107 | 88 | 129 | 118 | 118 | 103 | 110 | 105 | 108 | 125 | 106 | 115 |
| Appearance (whitening) | C | A | C | C | D | A | B | A | A | A | A | B | B | A | A |
| Ozone resistance | A | A | A | A | A | A | A | A | A | A | B | A | A | A | A |

The results obtained are shown in Table 1. Whitening by a wax could be suppressed in Comparative Example 2 in which only a processing aid was added, as compared with Comparative Example 1 as a control. However, cashew oil was not added. As a result, blackness and glossiness were as compared with that of Example 3. From this fact, it is considered that the cardol proportion of cashew oil is preferably high. For example, the cardol proportion is preferably 10 mass % or more, and more preferably 15 mass % or more. In Example 5, the cardanol proportion of cashew oil is lower than that in Example 1. As a result, glossiness was poor as compared with that in Example 1. From this fact, it is considered that the cardanol proportion of cashew oil is preferably high, and, for example, the cardanol proportion is preferably 70 mass % or more, and more preferably 75 mass % or more.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rubber composition comprising:
    a diene rubber,
    a hydrocarbon wax,
    cashew oil, and
    a processing aid comprising at least one selected from the group consisting of a fatty acid metal salt, a fatty acid amide, a fatty acid ester and a fatty acid ester amide, wherein the processing aid has a proportion of constituent fatty acid having from 18 to 20 carbon atoms of from 20 to 60 mass %.

2. The rubber composition according to claim 1, wherein the cashew oil is such that a proportion of cardol in monomers is from 10 to 30 mass %, and the proportion of cardanol in monomers is from 70 to 90 mass %.

3. The rubber composition according to claim 1, wherein an amount of the cashew oil is from 1 to 40 parts by mass per 100 parts by mass of the diene rubber, and the amount of the processing aid is from 1 to 10 parts by mass per 100 parts by mass of the diene rubber.

4. The rubber composition according to claim 1, wherein the hydrocarbon wax is at least one selected from the group consisting of petroleum wax, paraffin synthetic wax and polyolefin wax.

5. The rubber composition according to claim 1, wherein the cashew oil is at least one selected from the group consisting of a decarboxylated cashew nut shell liquid, a cashew monomer and a cashew polymer.

6. The rubber composition according to claim 1, wherein the processing aid is a mixture of; (D1) a fatty acid metal salt; and (D2) at least one selected from the group consisting of the fatty acid amide, the fatty acid ester and the fatty acid ester amide.

7. A pneumatic tire comprising a rubber part containing the rubber composition according to claim 1.

8. The pneumatic tire according to claim 7, wherein the rubber part is at least one selected from the group consisting of a tread rubber, a side wall rubber and a rim strip.

* * * * *